United States Patent
Sugihara et al.

(10) Patent No.: US 6,905,434 B2
(45) Date of Patent: Jun. 14, 2005

(54) SPEED CHANGE MECHANISM OF AUTOMATIC TRANSMISSION

(75) Inventors: Tsuyoshi Sugihara, Shizuoka (JP); Toshio Yamaguchi, Kanagawa (JP); Kazuo Oguri, Hiroshima (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/459,548

(22) Filed: Jun. 12, 2003

(65) Prior Publication Data

US 2003/0232685 A1 Dec. 18, 2003

(30) Foreign Application Priority Data

Jun. 13, 2002 (JP) ........................................ 2002-172610
May 12, 2003 (JP) ........................................ 2003-132893

(51) Int. Cl.$^7$ ................................................ F16H 3/62
(52) U.S. Cl. ........................................ 475/276; 475/342
(58) Field of Search ................................ 475/269, 271, 475/275, 276, 284, 296, 342

(56) References Cited

U.S. PATENT DOCUMENTS

| | | | | |
|---|---|---|---|---|
| 2,995,956 A | * | 8/1961 | Moore | 475/342 |
| 3,824,876 A | * | 7/1974 | Mori et al. | 475/276 |
| 4,014,223 A | * | 3/1977 | Pierce, Jr. | 475/55 |
| 4,483,212 A | * | 11/1984 | Ohtsuka | 475/54 |
| 4,850,247 A | * | 7/1989 | Yu | 475/342 |
| 5,106,352 A | | 4/1992 | Lepelletier | |
| 5,342,258 A | * | 8/1994 | Egyed | 475/281 |

FOREIGN PATENT DOCUMENTS

| | | |
|---|---|---|
| JP | 4-219553 A | 8/1992 |
| JP | 2001-349390 A | 12/2001 |

* cited by examiner

*Primary Examiner*—Sherry Estremsky
(74) *Attorney, Agent, or Firm*—Foley & Lardner LLP

(57) ABSTRACT

A first planetary gear unit is arranged to convert an input rotation from an input shaft to an output rotation whose speed is lower than that of the input rotation. A first unit including second and third planetary gear units is arranged between the first planetary gear unit and the output shaft. The first unit manages the first planetary gear unit's output rotation and provides the output shaft with seven types of rotation which correspond to 6-forward speed and one reverse positions. A second unit is arranged between the first planetary gear unit and the first unit to manage a power transmission therebetween. One of the second and third planetary gear units is of a double ring type, each being meshed with the sun gear and inside and outside ring gears, and a pinion carrier carrying the pinions. The pinion carrier is connected to the output shaft to rotate therewith.

19 Claims, 10 Drawing Sheets

|  | C 1 | C 2 | C 3 | B 1 | B 2 |
|---|---|---|---|---|---|
| 1st | ● |  |  | ● |  |
| 2nd | ● |  |  |  | ● |
| 3rd | ● | ● |  |  |  |
| 4th | ● |  | ● |  |  |
| 5th |  | ● | ● |  |  |
| 6th |  |  | ● |  | ● |
| Rev |  | ● |  | ● |  |

FIG.12

| | | INVENTION-I | RAVIGNEAWX-I | INVENTION-II | RAVIGNEAWX-II |
|---|---|---|---|---|---|
| PLANETARY GEAR RATIO | $\alpha_1$ | 0.54 | 0.54 | 0.61 | 0.65 |
| | $\alpha_2$ | 0.46 | 0.46 | 0.41 | 0.48 |
| | $\alpha_3$ | 0.59 | 0.37 | 0.48 | 0.35 |
| GEAR RATIO | 1st | 4.15 | 4.16 | 4.97 | 4.71 |
| | 2nd | 2.36 | 2.36 | 2.60 | 2.64 |
| | 3rd | 1.54 | 1.54 | 1.61 | 1.65 |
| | 4th | 1.14 | 1.14 | 1.14 | 1.16 |
| | 5th | 0.86 | 0.86 | 0.86 | 0.84 |
| | 6th | 0.68 | 0.68 | 0.71 | 0.68 |
| | Rev | 3.34 | 3.47 | 3.88 | 3.47 |
| GEAR SPACING RATIO | 1st/2nd | 1.76 | 1.76 | 1.92 | 1.79 |
| | 2nd/3rd | 1.53 | 1.53 | 1.61 | 1.60 |
| | 3rd/4th | 1.35 | 1.35 | 1.41 | 1.42 |
| | 4th/5th | 1.33 | 1.33 | 1.32 | 1.38 |
| | 5th/6th | 1.26 | 1.26 | 1.22 | 1.24 |
| RATIO COVERAGE | 1st/6th | 6.10 | 6.12 | 7.04 | 6.95 |
| RATIO COVERAGE | MIN. | 4.74 | 4.81 | 4.74 | 4.81 |
| | MAX. | 7.80 | 7.20 | 7.80 | 7.20 |

FIG.13

| | INVENTION | RAVIGNEAWX | COMPARATIVE EXAMPLE-I | COMPARATIVE EXAMPLE-II | COMPARATIVE EXAMPLE-III | COMPARATIVE EXAMPLE-IV |
|---|---|---|---|---|---|---|
| RATIO COVERAGE | 5.1 ~ 9.3 | 3.2 ~ 6.7 | 3.68 ~ 5.81 | 3.68 ~ 5.81 | 4.3 ~ 6.3 | 6.1 ~ 15.3 |
| 1-R RATIO | 0.46 ~ 0.99 | 0.63 ~ 1.58 | 0.63 ~ 1.36 | 1.22 ~ 3.58 | 0.52 ~ 0.96 | 0.38 ~ 0.6 |

SPEED CHANGE MECHANISM OF AUTOMATIC TRANSMISSION

BACKGROUND OF THE INVENTION

1. Field of the Invention

The present invention relates in general to automatic transmissions for wheeled motor vehicles, and more particularly to a speed change mechanism of the automatic transmissions, which has 6-forward speed and one reverse positions.

2. Field of the Related Art

One of the speed change mechanisms of the above-mentioned type is shown in FIG. 5 of Japanese Laid-open Patent Application (Tokkaihei) 4-219553. The speed change mechanism of this published application comprises generally an input shaft, a planetary gear train including a single pinion type gear unit and two single pinion type gear units, three clutches, two brakes and an output shaft. For achieving 6-forward speed and one reverse portions, the three clutches and two brakes are selectively engaged and disengaged in a given manner.

To provide the speed change mechanism with an overdrive speed position, it is necessary to apply an input force to a pinion carrier and a ring gear of the planetary gear train. However, if this necessity is made in an arrangement wherein the input and output shaft are arranged coaxially, the single pinion type planetary gear, which has only three rotational members, can not provide an input power path for the pinion carrier and the ring gear. For providing such power path, the input and output shafts have to be arranged on different axes which are parallel with each other. However, this arrangement tends to induce a bulky construction of an associated automatic transmission, particularly, the size in a radial direction.

In order to solve such drawback in size, the same published application shows in FIG. 3 another speed change mechanism. In this mechanism, the input and output shafts are arranged coaxially, and in place of the above-mentioned planetary gear train including the two single pinion type gear units, a ravigneawx type complex planetary gear train is used. This gear train has an arrangement wherein two planetary gear units are arranged having their double pinions engaged with respective sun gears.

In this ravigneawx type transmission, one of the planetary gear units has a double pinion type. This means increase in number of portions where gear meshing is made for achieving power transmission. However, increase in number of such portions tends to induce undesirable gear noise and vibration. For preventing such noise and vibration, highly accurate and thus expensive machining and assembling process is needed.

In view of the above-mentioned drawbacks, Japanese Laid-open Patent Application 2001-349390 has proposed in FIGS. 9, 20, 13 and 34, a 6-forward speed and one reverse speed change mechanism which comprises coaxially arranged input and output shafts, a planetary gear train including one speed reduction planetary gear unit and two single pinion planetary gear units, three clutches and two brakes.

SUMMARY OF THE INVENTION

In the speed change mechanism of the application 2001-349390, even if respective planetary gear ratios (viz., number of teeth of sun gear/number of teeth of ring gear) of the speed reduction planetary gear unit and the two single pinion planetary gear unit are set in a preferable range, it tends to occur that a ratio coverage from $1^{st}$ forward speed to $6^{th}$ forward speed (viz., gear ratio at $1^{st}$ forward speed/gear ratio at $6^{th}$ forward speed) becomes narrowed and the rate between gear ratio at reverse position and gear ratio at $1^{st}$ forward speed (viz., gear ratio at reverse position/gear ratio at $1^{st}$ forward speed: which will be referred to "1-R ratio" for ease of description) is not set to a suitable value.

As is known, narrowing the ratio coverage debases the essential feature of 6-forward speed and one reverse position transmission, deteriorating freedom in selecting speeds. Furthermore, if the ratio coverage fails to have a satisfied maximum value, fuel consumption and drivability of an associated motor vehicle become poor.

Furthermore, if the "1-R ratio" fails to be set at a desired value, that is, for example, if the "1-R ratio" is set at a smaller value, drivability of the vehicle becomes poor because respective output torques produced at $1^{st}$ forward speed and reverse position are largely different. Furthermore, if the gear ratio for $1^{st}$ forward speed is set at a desired value, the gear ratio for reverse position is inevitably set to have a higher speed side. In this case, it is necessary to increase the accelerator open degree largely for obtaining a satisfied torque in the reverse position. On the contrary, if the gear ratio for reverse position is set at a desired value, the gear ratio for $1^{st}$ forward speed is inevitably set to have a very low speed side. In this case, fuel consumption and drivability of the vehicle become poor.

In view of the above-mentioned various facts in conventional technique, the present invention aims to provide a speed change mechanism of an automatic transmission, in which input and output shafts are arranged coaxially for achieving a compact construction of the mechanism, a freedom in selecting gear ratio is sufficiently obtained and drivability and fuel consumption of an associated motor vehicle are improved.

According to a first aspect of the present invention, there is provided a speed change mechanism of an automatic transmission for achieving 6-forward speed and one reverse positions, which comprises an input shaft adapted to be driven by a power source; an output shaft coaxially arranged with the input shaft; a first planetary gear unit which converts an input rotation from the input shaft to an output rotation whose speed is lower than that of the input rotation; and a first unit including second and third planetary gear units and arranged between the first planetary gear unit and the output shaft, the first unit being arranged to provide, by managing the output rotation from the first planetary gear unit, the output shaft with seven types of rotation which respectively correspond to the 6-forward speed and one reverse positions; and a second unit arranged between the first planetary gear unit and the first unit to manage a power transmission therebetween, wherein one of the second and third planetary gear units is of a double ring type which comprises a sun gear powered by the first planetary gear unit, inside and outside ring gears concentrically disposed around the sun gear, pinions each being meshed with the sun gear and the inside and outside ring gears, and a pinion carrier carrying the pinions, the pinion carrier being connected to the output shaft to rotate therewith.

According to a second aspect of the present invention, there is provided a speed change mechanism of an automatic transmission for achieving 6-forward speed and one reverse positions, which comprises an input shaft adapted to be driven by a power source; an output shaft coaxially arranged with the input shaft; a first planetary gear unit including a first sun gear fixed to a case of the transmission, a first ring gear connected to the input shaft, first pinions each being meshed with both the first sun gear and the first ring gear and a first pinion carrier carrying the first pinions; a second planetary gear unit including a second sun gear, a second ring gear, second pinions each being meshed with both the second sun gear and the second ring gear and a second pinion carrier carrying the second pinions; a third planetary gear unit including a third sun gear, third and fourth ring gears, third pinions each being meshed with the third sun gear and the third and fourth ring gears and a third pinion carrier carrying the third pinions; a first connecting member connecting the second pinion carrier to the fourth ring gear; a second connecting member connecting the first ring gear to the third ring gear; a third clutch incorporated with the second connecting member; a third connecting member connecting the second ring gear to the output shaft; a fourth connecting member connecting the first pinion carrier to the second sun gear; a second clutch incorporated with the fourth connecting member; a fifth connecting member connecting the first pinion carrier to the third sun gear; a first clutch incorporated with the fifth connecting member; a center member connecting the third pinion carrier to the third connecting member, the center member extending radially outward from the third pinion carrier to the third connecting member through a space defined between the third and fourth ring gears; a first brake which is able to brake the second pinion carrier; and a second brake which is able to brake the second sun gear.

BRIEF DESCRIPTION OF THE DRAWINGS

Other objects and advantages of the present invention will become apparent from the following description when taken in conjunction with the accompanying drawings, in which:

FIG. 12 is a comparative table showing the performance of the speed change mechanism of the invention and that of the speed change mechanism equipped with the ravigneawx type planetary gear train;

FIG. 13 is a comparative table showing respectively the ratio coverage and 1-R ratio in case of the speed change mechanism of the invention, a speed change mechanism including a single pinion type planetary gear unit and a ravigneawx type planetary gear unit and a speed change mechanism including a single speed reduction planetary gear unit and two single pinion type planetary gear units;

DETAILED DESCRIPTION OF THE INVENTION

In the following, an embodiment of the present invention will be described in detail with reference to the accompanying drawings.

Figures 1, 2:
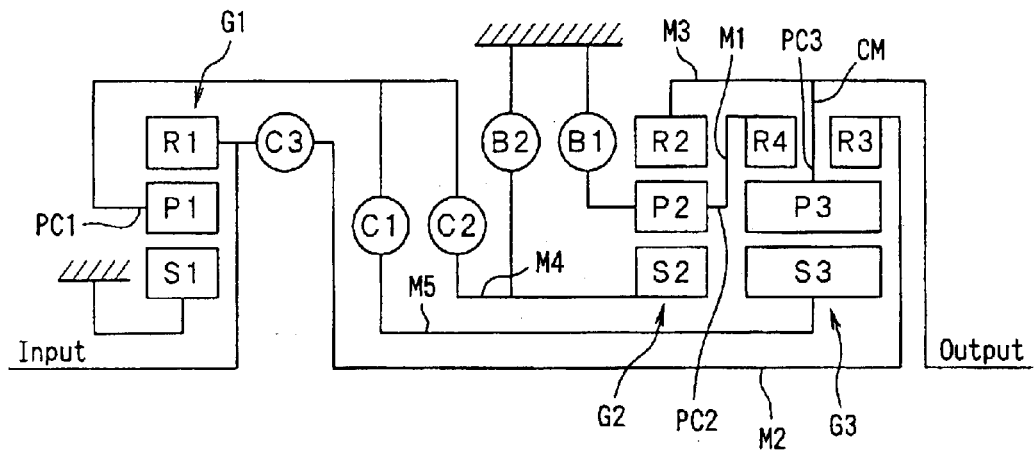
FIG. 1 is a schematic view of a speed change mechanism of an automatic transmission, which is an embodiment of the present invention.
FIG. 2 is a table showing ON/OFF condition of each friction element with respect to six forward speed and reverse positions established in the speed change mechanism of the present invention.

FIG. 1 shows schematically a speed change mechanism of an automatic transmission, which is the embodiment of the present invention.

In the drawing, denoted by "Input" is an input shaft into which a torque is applied from an engine (not shown) through a torque converter (not shown), and denoted by "Output" is an output shaft from which a torque is led to driven road wheels (not shown) of an associated motor vehicle through a final gear (not shown). These input and output shafts are arranged coaxially, as shown.

In the side of the input shaft "Input", there is arranged a first planetary gear unit G1 which converts an input rotation from the input shaft "Input" to an output rotation whose speed is lower than that of the input rotation. While, in the side of the output shaft "Output", there are arranged a second planetary gear unit G2 and a double ring type third planetary gear unit G3.

Denoted by "C1" is a first clutch, "C2" is a second clutch, "C3" is a third clutch, "B1" is a first brake, "B2" is a second brake, "M1" is a first connecting member, "M2" is a second connecting member, "M3" is a third connecting member, "M4" is a fourth connecting member and "M5" is a fifth connecting member.

The first planetary gear unit G1 is of a single pinion type and comprises a first sun gear S1, a first ring gear R1, first pinions P1 each meshed with both the first sun gear S1 and the first ring gear R1 and a first pinion carrier PC1 carrying the first pinions P1.

The second planetary gear unit G2 is of a single pinion type and comprises a second sun gear S2, a second ring gear R2, second pinions P2 each meshed with both the second sun gear S2 and the second ring gear R2 and a second pinion carrier PC2 carrying the second pinions P2.

The third planetary gear unit G3 is of a double ring gear type and comprises a third sun gear S3, two, viz., third and fourth ring gears R3 and R4, third pinions P3 each meshed with the third sun gear S3 and the third and fourth ring gears R3 and R4, and a third pinion carrier PC3 which carries the third pinions P3 and has a center member CM arranged between third and fourth ring gears R3 and R4. The center member CM is connected to the third pinion carrier PC3 at spaced positions of the third pinions P3 which are placed in the vicinity of a periphery of the third pinion carrier PC3.

The first clutch C1 functions to selectively engage and disengage the first pinion carrier PC1 of the first planetary gear unit G1 to and from the third sun gear S3 of the third planetary gear unit G3. The second clutch C2 functions to selectively engage and disengage the first pinion carrier PC1 of the first planetary gear unit G1 to and from the second sun gear S2 of the second planetary gear unit G2. The third clutch C3 functions to selectively engage and disengage the first ring gear R1 of the first planetary gear unit G1 to and from the third ring gear R3 of the third planetary gear unit G3.

The first brake B1 functions to selectively brake the second pinion carrier PC2 of the second planetary gear unit G2. The second brake B2 functions to selectively brake the second sun gear S2 of the second planetary gear unit G2.

The first connecting member M1 connects the second pinion carrier PC2 to the fourth ring gear of the third planetary gear unit G3. The second pinion carrier PC2 is connected to the first brake B1.

The second connecting member M2 connects the third ring gear R3 of the third planetary gear unit G3 to the first ring gear R1 of the first planetary gear unit G1. The third clutch C3 is incorporated with the second connecting member M2.

The third connecting member M3 connects the second ring gear R2 to the output shaft "Output".

The center member CM connects the third pinion carrier PC3 to the third connecting member M3 which radially outwardly extending in a space defined between the third and fourth ring gears R3 and R4, as shown.

The fourth connecting member M4 connects the second sun gear S2 of the second planetary gear unit G2 to the first pinion carrier PC1 of the first planetary gear unit G1. The second clutch C2 is incorporated with the fourth connecting member M4. The fourth connecting member M4 is connected to the second brake B2, as shown.

The fifth connecting member M5 connects the third sun gear S3 of the third planetary gear unit G3 to the fourth connecting member M4. The first clutch C1 is incorporated with the fifth connecting member M5.

To the first to third clutches C1, C2 and C3 and first and second brakes B1 and B2, there are respectively connected hydraulically actuating devices (not shown) of a speed change control device.

When the above-mentioned clutches C1, C2 and C3 and brakes B1 and B2 are engaged or disengaged by the hydraulically actuating devices in a manner as is indicated by the table of FIG. 2, 6-forward speed and one reverse positions are selectively obtained. As the speed change control device, a hydraulic type, electronic type or a combination of these types may be used.

It is to be noted that the table of FIG. 2 depicts the engaged/disengaged condition of each frictional element with respect to a speed position (or reverse position) assumed by the speed change mechanism. Engaged condition is represented by a black circle, and disengaged condition is represented by a blank.

In the following, operation of the speed change mechanism will be described with reference to the alignment chart of FIG. 3 and the torque transmitting paths of FIGS. 4 to 10 of the drawings. In FIGS. 4 to 10, established torque transmitting path is indicated by hatched blocks and thicker lines.

1$^{st}$ Forward Speed

As is seen from the table of FIG. 2, in 1$^{st}$ forward speed of the speed change mechanism, both the first clutch C1 and first brake B1 are engaged respectively.

Figure 4:
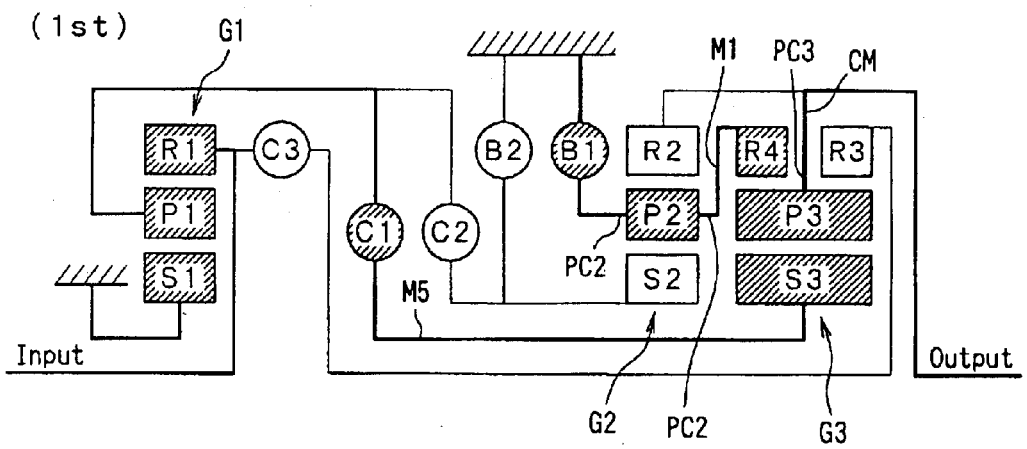
FIGS. 4 to 9 are views similar to FIG. 1, but showing torque transmitting paths established in $1^{st}$, $2^{nd}$, $3^{rd}$, $4^{th}$, $5^{th}$ and $6^{th}$ forward speeds of the speed change mechanism of the present invention, respectively.

As is seen from FIG. 4, in this 1$^{st}$ forward speed, due to the engagement of the first clutch C1, a reduced speed rotation in normal direction from the first planetary gear unit G1 is inputted to the third sun gear S3 of the third planetary gear unit G3 through the fifth connecting member M5.

In the second planetary gear unit G2, due to engagement of the first brake B1, the second pinion carrier PC2 is fixed to the case. In addition, the fourth ring gear R4 of the third planetary gear unit G3, that is connected to the second pinion carrier PC2 through the first connecting member M1, is also fixed to the case.

Thus, although the third sun gear S3 of the third planetary gear unit G3 is applied with the reduced speed rotation in the normal direction, the fixed condition of the fourth ring gear R4 induces that a further reduced speed rotation is outputted from the third pinion carrier PC3 to the output shaft "Output" through the center member CM.

Figure 3:
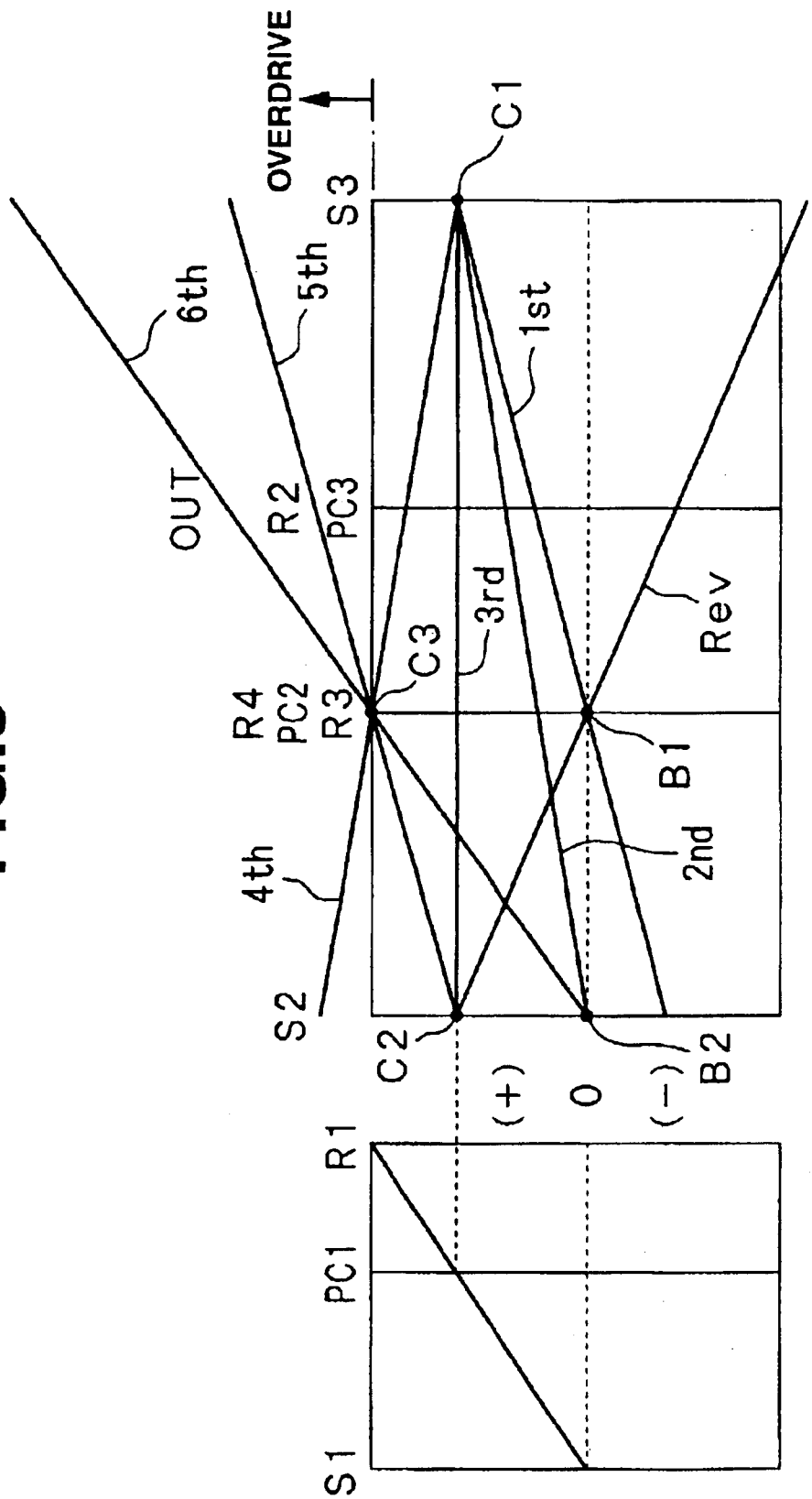
FIG. 3 is an alignment chart representing the dynamic feature of the speed change mechanism of the invention.

Accordingly, in the 1$^{st}$ forward speed, as is shown in the alignment chart of FIG. 3, there is established a characteristic line "1st" which connects an engaging point of the first clutch C1 through which the reduced speed rotation from the first planetary gear unit G1 is transmitted to the third sun gear S3 of the third planetary gear unit G3 and an engaging point of the first brake B1 by which a rotation of the second pinion carrier PC2 of the second planetary gear unit G2 is stopped. That is, rotation inputted from the input shaft "Input" is outputted to the output shaft "Output" while being reduced in speed.

2$^{nd}$ Forward Speed

As is seen from the table of FIG. 2, in 2$^{nd}$ forward speed, both the first clutch C1 and the second brake B2 are engaged respectively.

Figure 5:
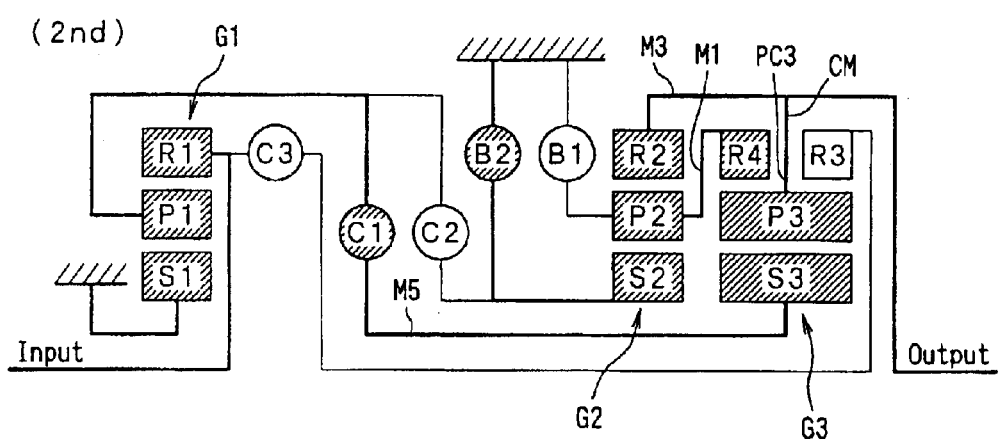

As is seen from FIG. 5, in this 2$^{nd}$ forward speed, due to engagement of the first clutch C1, a reduced speed rotation in normal direction from the first planetary gear unit G1 is inputted to the third sun gear S3 of the third planetary gear unit G3 through the fifth connecting member M5, and a rotation is transmitted to the output shaft "Output" from the third pinion carrier PC3 through the center member CM.

In the second planetary gear unit G2, due to engagement of the second brake B2, the second sun gear S2 is fixed to the case. In addition, into the second pinion P2, there is inputted a reduced speed rotation in normal direction from the fourth ring gear R4 of the third planetary gear unit G3 through the first connecting member M1. Due to the fixed condition of the second sun gear S2, the second ring gear R2 is force to rotate in normal direction at an increased speed. The rotation of the second ring gear R2 is transmitted to the third connecting member M3.

Accordingly, in the third planetary gear unit G3, a reduced speed rotation in normal direction is transmitted from the third pinion carrier PC3 to the unit G3 through the center member CM, and in the second planetary gear unit G2, an increased speed rotation in normal direction is transmitted from the second ring gear R2 to the unit G2 through the third connecting member M3, so that a rotation that is higher than that in the 1$^{st}$ forward speed is transmitted to the output shaft "Output".

Accordingly, in 2$^{nd}$ forward speed, as is shown in the alignment chart of FIG. 3, there is established a characteristic line "2nd" which connects an engaging point of the first clutch C1 through which the reduced speed rotation from the first planetary gear unit G1 is transmitted to the third sun gear S3 of the third planetary gear unit G3 and an engaging point of the second brake B2 by which a rotation of the second sun gear S2 of the second planetary gear unit G2 is stopped. That is, rotation inputted from the input shaft "Input" is outputted to the output shaft "Output" while being increased in speed to a value higher than that in 1$^{st}$ forward speed.

3$^{rd}$ Forward Speed

As is seen from the table of FIG. 2, in 3$^{rd}$ forward speed, both the first and second clutches C1 and C2 are engaged respectively.

Figure 6:
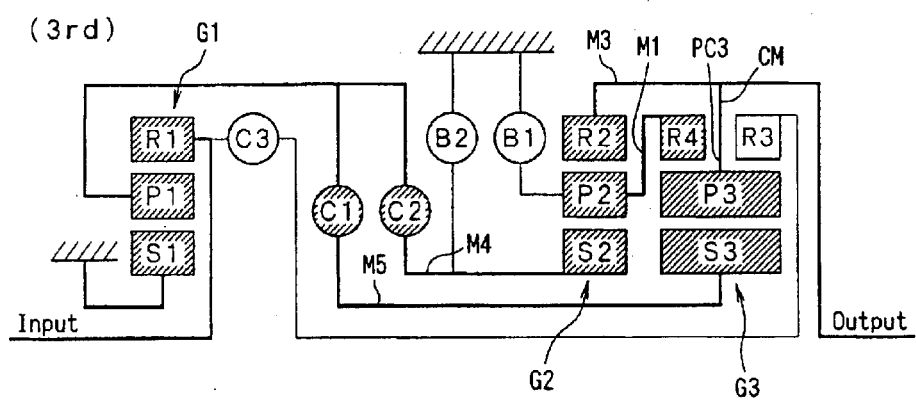

As is seen from FIG. 6, in this 3$^{rd}$ forward speed, due to engagement of the first clutch C1, a reduced speed rotation in normal direction from the first planetary gear unit G1 is inputted to the third sun gear S3 of the third planetary gear unit G3 through the fifth connecting member M5, and a rotation is transmitted to the output shaft "Output" from the third pinion carrier PC3 through the center member CM. At the same time, due to engagement of the second clutch C2, the reduced speed rotation in normal direction from the first planetary gear unit G1 is transmitted to the second sun gear S2 of the second planetary gear unit G2 through the fourth connecting member M4, and a rotation is transmitted to the output shaft "Output" from the second ring gear R2 through the third connecting member M3.

Accordingly, in 3$^{rd}$ forward speed, as is seen from the alignment chart of FIG. 3, there is established a characteristic line "3rd" which connects an engaging point of the first clutch C1 through which the reduced speed rotation from the first planetary gear unit G1 is transmitted to the third sun gear S3 of the third planetary gear unit G3 and an engaging point of the second clutch C2 through which the reduced speed rotation from the first planetary gear unit G1 is transmitted to the second sun gear S2 of the second planetary gear unit G2. That is, rotation inputted from the input shaft "Input" is outputted to the output shaft "Output" while being increased in speed to a value higher than that in 2$^{nd}$ forward speed.

4$^{th}$ Forward Speed

As is seen from the table of FIG. 2, in 4$^{th}$ forward speed, both the first clutch C1 and the third clutch C3 are engaged respectively.

Figure 7:
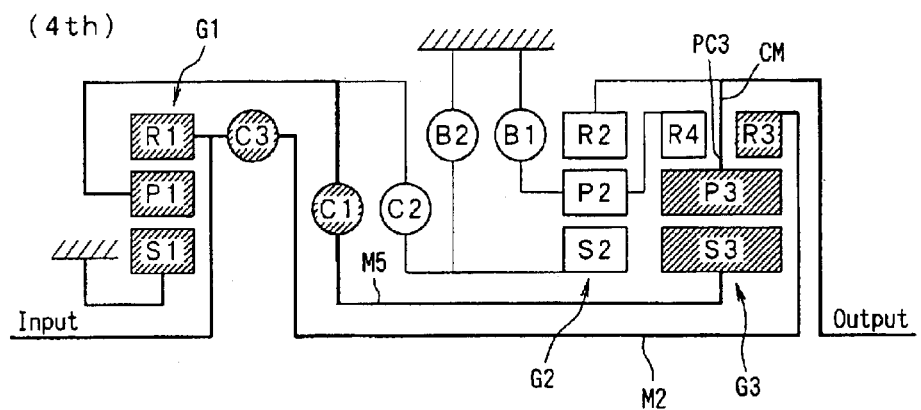

As is seen from FIG. 7, in 4$^{th}$ forward speed, due to engagement of the first clutch C1, a reduced speed rotation in normal direction from the first planetary gear unit G1 is inputted to the third sun gear S3 of the third planetary gear unit G3, and, due to engagement of the third clutch C3, a rotation of the input shaft "Input" is inputted to the third ring gear R3 of the third planetary gear unit G3 through the second connecting member M2.

Accordingly, in 4$^{th}$ forward speed, the third sun gear S3 is applied with a reduced speed rotation and the third ring gear R3 is applied with an increased speed rotation, and thus, a rotation provided by increasing the reduced speed rotation of the third sun gear S3, that is lower than that of the input rotation), is outputted to the output shaft "Output" from the third pinion carrier PC3 through the center member CM.

Accordingly, in 4$^{th}$ forward speed, as is seen from the alignment chart of FIG. 3, there is established a characteristic line "4th" which connects an engaging point of the first clutch C1 through which the reduced speed rotation from the first planetary gear unit G1 is transmitted to the third sun gear S3 of the third planetary gear unit G3 and an engaging point of the third clutch C3 through which the rotation of the input shaft "Input" is inputted to the third ring gear R3 of the third planetary gear unit G3. That is, rotation inputted from the input shaft "Input" is outputted to the output shaft "Output" while being increased in speed to a value higher than that in 3$^{rd}$ forward speed.

5$^{th}$ Forward Speed

As is seen from the table of FIG. 2, in 5$^{th}$ forward speed, both the second clutch C2 and the third clutch C3 are engaged respectively.

Figure 8:
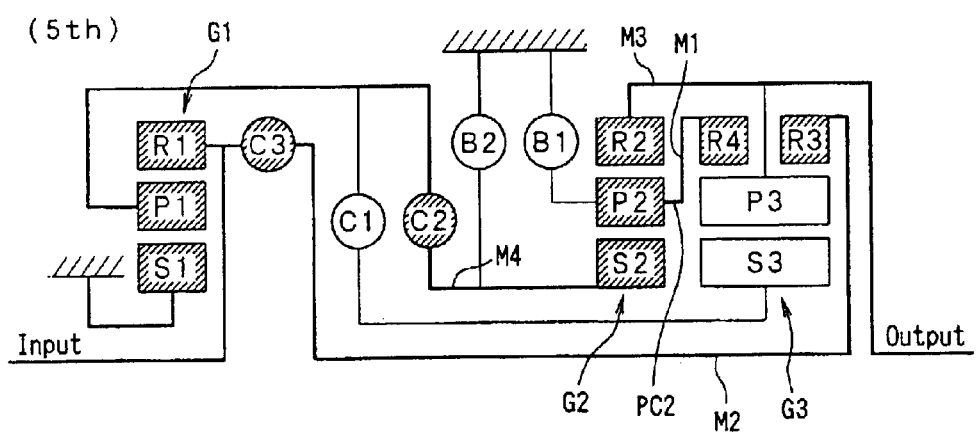

As is seen from FIG. 8, in 5$^{th}$ forward speed, due to engagement of the second clutch C2, the reduced speed rotation from the second planetary gear unit G2 is inputted to the second sun gear S2 of the second planetary gear unit G2 through the fourth connecting member M4. and at the same time, due to engagement of the third clutch C3, the rotation of the input shaft "Input" is inputted to the third ring gear R3 of the third planetary gear unit G3 through the second connecting member M2.

Accordingly, in 5$^{th}$ forward speed, the reduced speed rotation is applied to the second sun gear S2 and the rotation of the input shaft "Input" is inputted to the second pinion carrier PC2 through the first connecting member M1, and thus, a rotation that is higher in speed than the input shaft "Input" is outputted from the second ring gear R2 to the output shaft "Output" through the third connecting member M3.

Accordingly, in 5$^{th}$ forward speed, as is seen from the alignment chart of FIG. 3, there is established a characteristic line "5th" which connects an engaging point of the second clutch C2 through which the reduced speed rotation from the first planetary gear unit G1 is inputted to the second sun gear S2 of the second planetary gear unit G2 and an engaging point of the third clutch C3 through which the rotation of the input shaft "Input" is inputted to the third ring gear "R3" of the third planetary gear unit G3. That is, rotation inputted from the input shaft "Input" is outputted to the output shaft "Output" while being increased in speed to a value higher than that in 4$^{th}$ forward speed.

6$^{th}$ Forward Speed

As is seen from the table of FIG. 2, in 6$^{th}$ forward speed, both the third clutch C3 and the second brake B2 are engaged respectively.

Figure 9:
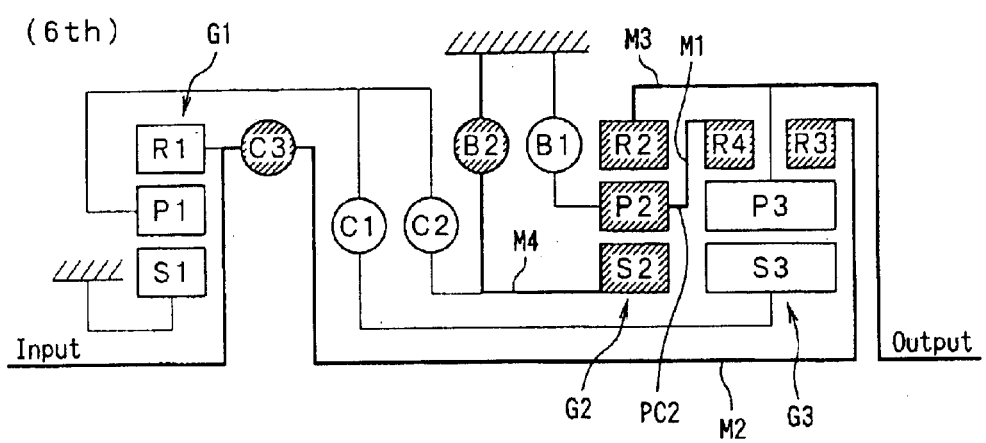

As is seen from FIG. 9, in 6$^{th}$ forward speed, due to engagement of the third clutch C3, the rotation of the input shaft "Input" is inputted to the third ring gear R3 of the third planetary gear unit G3 through the second connecting member M2, and at the same time, due to engagement of the second brake B2, the second sun gear S2 of the second planetary gear unit G2 is fixed to the case.

Accordingly, in 6$^{th}$ forward speed, the rotation of the input shaft "Input" is inputted to the second pinion carrier PC2 from the fourth ring gear R4 of the third planetary gear unit G3 through the first connecting member M1, and due to fixing of the second sun gear S2, a rotation that is much higher in speed than the input shaft "Input" is outputted from the second ring gear R2 to the output shaft "Output" through the third connecting member M3.

Accordingly, in 6$^{th}$ forward speed, as is seen from the alignment chart of FIG. 3, there is established a characteristic line "6th" which connects an engaging point of the third clutch C3 through the rotation of the input shaft "Input" is inputted to the third ring gear R3 of the third planetary gear unit G3 and an engaging point of the second brake B2 through which the second sun gear S2 of the second planetary gear unit G2 is fixed to the case. That is, rotation inputted from the input shaft "Input" is outputted to the output shaft "Output" while being increased in speed to a value higher than that in 5$^{th}$ speed.

Reverse position

As is seen from the table of FIG. 2, in reverse position, both the second clutch C2 and the first brake B1 are engaged respectively.

Figure 10:
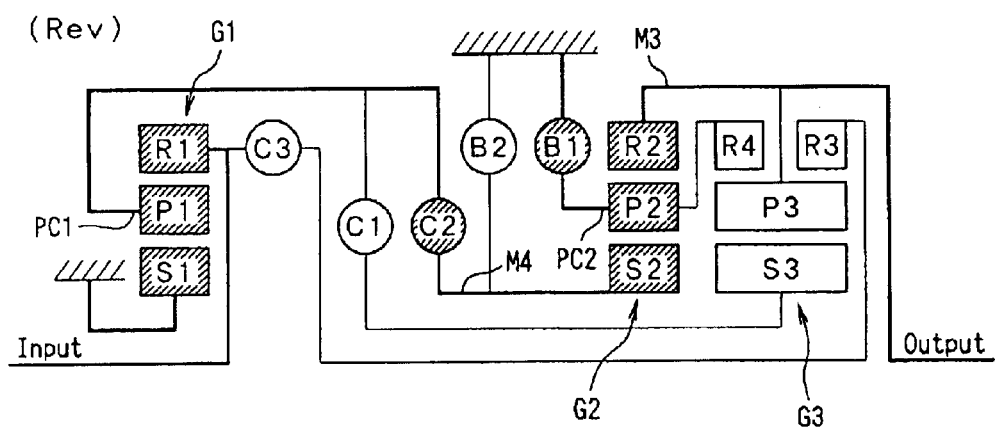
FIG. 10 is a view similar to FIG. 1, but showing a torque transmitting path established in a reverse position of the speed change mechanism of the present invention.

As is seen from FIG. 10, in reverse position, due to engagement of the second clutch C2, the reduced speed rotation from the first planetary gear unit G1 is inputted to the second sun gear S2 of the second planetary gear unit G2, and due to fixing of the first brake B1, the second pinion carrier P2 of the second planetary gear unit G2 is fixed to the case.

Accordingly, in reverse position, the second sun gear S2 is applied with a reduced speed rotation in reversed direction, due to fixing of the second pinion carrier PC2 to the case, a reduced speed rotation in reversed direction is inputted to the output shaft "Output" from the second ring gear R2 through the third connecting member M3.

Accordingly, in reverse position, as is seen from the alignment chart of FIG. 3, there is established a characteristic line "Rev" which connects an engaging point of the second clutch C2 through which the reduced speed rotation from the first planetary gear unit G1 is inputted to the second sun gear S2 of the second planetary gear unit G2 and an engaging point of the first brake B1 through which the rotation of the second pinion carrier PC2 of the second planetary gear unit G2 is stopped. That is, rotation inputted from the input shaft "Input" is outputted to the output shaft "Output" while being decreased in speed and reversed in rotation direction.

In the following, advantageous features of the speed change mechanism of the present invention will be described with the aid of the accompanying drawings.

For clarifying the features of the invention, two conventional speed change mechanisms will be also briefly described, which are the mechanism shown in Japanese Laid-open Patent Application (Tokkaihei) 4-219553 and the mechanism shown in Japanese Laid-open Patent Application 2001-349390. That is, the mechanism of 4-219553 is a speed change mechanism equipped with a ravigneawx type planetary gear train, the mechanism of 2001-349390 is a speed change mechanism comprising a planetary gear train including one speed reduction planetary gear unit and two single pinion planetary gear units.

Figure 11:
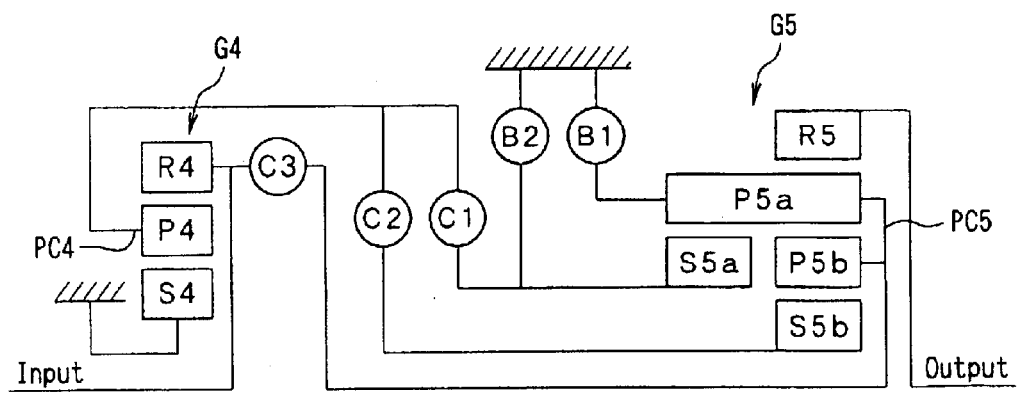
FIG. 11 a view similar to FIG. 10, but showing a speed change mechanism equipped with a ravigneawx type planetary gear train.

FIG. 11 is a schematic view of the speed change mechanism of 4-219553. As shown, the mechanism comprises a single pinion planetary gear unit G4 and a ravigneawx type planetary gear train G5. The gear unit G4 comprises a sun gear S4, a ring gear R4, pinions P4 meshed with both the sun gear S4 and the ring gear R4, and a pinion carrier PC4 carrying the pinions P4. The ravigneawx type planetary gear train G5 comprises two sun gears S5$a$ and S5$b$, two groups of pinions P5$a$ and P5$b$ respectively meshed with the sun gears S5$a$ and S5$b$, a ring gear R5 and a pinion carrier PC5.

(1) Compactness

In order to provide the speed change mechanism with an over-drive speed, application of input to the pinion carrier and ring gear is usually needed. In the mechanism of ravigneawx type of FIG. 11, the input and output shafts "Input" and "Output" are arranged coaxially establishing the needed input application to the pinion carrier PC5 and ring gear R5. Thus, this mechanism establishes the over-drive speed without increasing the radial size thereof.

Also in the speed change mechanism of the present invention, the over-drive speed is established without increasing the radial size thereof for the same reason as has just mentioned hereinabove. That is, as is seen in FIG. 1, the combined planetary gear train including the single pinion type second planetary gear unit G2 and the double ring gear type third planetary gear unit G3 has five connecting members, which are the first connecting member M1 extending between the fourth ring gear R4 and second pinion carrier PC2, the second connecting member M2 extending between the third ring gear R3 and third clutch C3, the third connecting member M3 extending between the second ring gear R2 and the output shaft "Output", the fourth connecting member M4 extending between the second sun gear S2 and second clutch C2 and the fifth connecting member M5 extending between the third sun gear S3 and the first clutch C1. Due to provision of the center member CM which extends radially outward between the third ring gear R3 and fourth ring gear R4, torque output is easily achieved. Thus, in the speed change mechanism of the invention, higher speeds that need the force input to the pinion carrier and ring gear are easily obtained with a compact size.

(2) Noise Reduction

In the ravigneawx type speed change mechanism, two groups of pinions P5$a$ and P5$b$ are provided in the gear train G5 as is seen from FIG. 11. However, employment of the two groups of pinions tends to produce noises and vibrations due to increase in number of contact points where gear meshing is made.

In the speed change mechanism of the present invention, there is no means that correspond to the two groups of pinions P5$a$ and P5$b$. Thus, undesired noises and vibrations caused by such groups are not produced.

(3) Widening of Gear Ratio Coverage

FIG. 12 is a table showing the performance of the speed change mechanism of the present invention and that of the speed change mechanism equipped with the ravigneawx type planetary gear train. INVENTION-I and INVENTION-II are speed change mechanisms of the present invention, which have different planetary gear ratio, and RAVIGNEAWX-I and RAVIGNEAWX-II are the speed change mechanism of the ravigneawx type, which have different planetary gear ratio, as is shown in the table. In INVENTION-I and INVENTION-II, $\alpha 1$, $\alpha 2$ and $\alpha 3$ denote planetary gear ratios of the first, second and third planetary gear units G1, G2 and G3 respectively, and in RAVIGNEAWX-I and RAVIGNEAWX-II, $\alpha 1$ denotes a planetary gear ratio of the planetary gear unit G4, $\alpha 2$ denotes a planetary gear ratio of the side of the sun gear S5$a$ of the planetary gear unit G5 and $\alpha 3$ denotes a planetary gear ratio of the side of the other sun gear S5$b$ of the gear unit G5.

First, the speed change mechanism of ravigneawx type will be considered. In general, in this speed change mechanism, the radial size of the part of a case where the planetary gear unit G5 is installed increases when the planetary gear ratio "$\alpha$" (viz. number of teeth of sun gear/number of teeth of ring gear) is within a commonly employed range from 0.35 to 0.65 and an appropriate arrangement is employed wherein the gear spacing ratio lowers as the gear change has a higher speed position. That is, in the ravigneawx type, when the planetary gear ratio "$\alpha 1$" is set at a small value, it becomes impossible to widen the gear ratio for achieving the above-mentioned conditions. While, when the planetary gear ratio "$\alpha 3$" is set at a small value (viz., 0.37 in case of RAVIGNEAWX-I and 0.35 in case of RAVIGNEAWX-II), widening of the gear ratio is achieved. However, as is seen from FIG. 11, due to provision of the connecting members around the axis of the ravigneawx type planetary gear train G5, there is a limit in reducing the diameter of the sun gear S5$b$. Thus, for widening the gear ratio, that is, for causing the planetary gear ratio "$\alpha 3$" to have a small value, it is necessary to increase the diameter of the ring gear R5. However, increase in diameter of the ring gear R5 brings about the radial enlargement of the case in which the gear train G5 is installed. This undesirable phenomenon becomes much severe when the transmission to which the speed change mechanism of the ravigneawx type is applied is of a type for use with a front engine rear drive motor vehicle. In short, in case of the ravigneawx type, it is difficult to widen the gear ratio without increasing the size of the transmission case.

While, in the speed change mechanism of the present invention, the above-mentioned conditions are satisfied even when the planetary gear ratio "α3" is set at a relatively large value (for example, 0.59 in INVENTION-1). Accordingly, as is seen from FIG. 1, even if the connecting members are arranged around the axis of the third planetary gear unit G3, it is unnecessary to reduce the diameter of the third sun gear S3. That is, it is unnecessary to increase the diameter of the third and fourth ring gears R3 and R4, and thus, the undesired radial expansion of the transmission case is not induced.

(4-1) Ratio coverage without considering the gear spacing ratio

In general, the range of planetary gear ratio "α" is from 0.35 to 0.65. Preferably, the range is from 0.38 to 0.60.

FIG. 13 is a comparative table showing at the upper row respective ratio coverage values (viz., gear ratio at $1^{st}$ forward speed/gear ratio at $6^{th}$ forward speed) of the speed change mechanism of the invention, the ravigneawx type speed change mechanism of Japanese Laid-open Patent Application 4-219553 and the speed change mechanism of Japanese Laid-open Patent Application 2001-349390 in case wherein the range is set from 0.38 to 0.60 without considering the gear spacing ratio. COMPARATIVE EXAMPLES I, II, III and IV are the speed change mechanism shown in FIGS. 9, 10, 13 and 34 of the Laid-open application 2001-349390.

Figure 14:
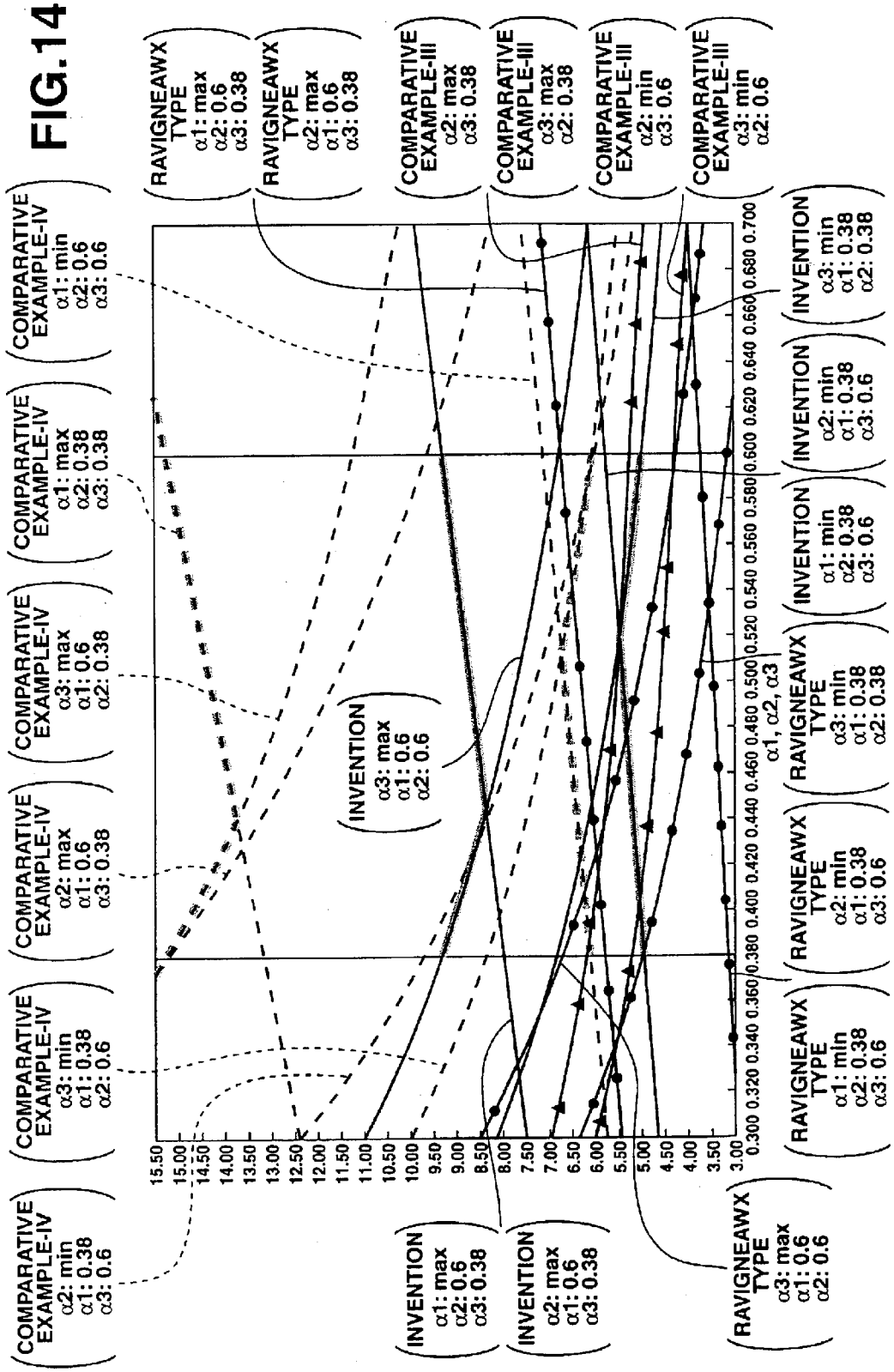
FIG. 14 is a comparative graph showing a change of the ratio coverage in case of the speed change mechanism of the invention, the speed change mechanism including the single pinion type planetary gear unit and the ravigneawx type planetary gear unit and the speed change mechanism including the single speed reduction planetary gear unit and the two single pinion type planetary gear units.

FIG. 14 is a comparative graph showing a change of the ratio coverage in case of the speed change mechanism of the invention, the ravigneawx type speed change mechanism and the speed change mechanism of the Laid-open application 2001-349390 with at least one of the planetary gear ratios α1, α2 and α3 being varied. It is to be noted that in the mechanism of the 2001-349390, the planetary gear ratio α1 is the ratio possessed by a speed reduction planetary gear unit arranged in corporation with the input shaft, the planetary gear ratio α3 is the ration possessed by a single pinion type planetary gear unit arranged in corporation with the output shaft, and the planetary gear ratio α2 is the ratio possessed by a single pinion type planetary gear unit that is arranged between the previously mentioned two planetary gear units.

In the following, the ratio coverage of each speed change mechanism will be considered with reference to the contents of the upper row of the table of FIG. 13 and the graph of FIG. 14.

In the ravigneawx type speed change mechanism, the ratio coverage has a narrower range from the minimum value 3.2 to the maximum value 6.7, and thus, widening of the gear ratio coverage is not achieved. Also in the COMPARATIVE EXAMPLES-I, II and III, the ratio coverage has a narrower range, and thus, widening of the gear ratio coverage is not achieved. That is, in such speed change mechanisms, widening of the gear ratio coverage is not expected even if the mechanism has multistage gears. While, in the COMPARATIVE EXAMPLE-IV, the ratio coverage has a wider range from the minimum value 6.1 to the maximum value 15.3, and thus, widening of the gear ratio coverage and increase in freedom in selecting the gear ratio are achieved.

In the INVENTION, the ratio coverage has a range from the minimum value 5.1 to the maximum value 9.3. Although the range is somewhat narrower than that of the COMPARATIVE EXAMPLE-IV, satisfied widening of the gear ratio coverage and satisfied increase in freedom in selecting the gear ratio are expected.

(4-2) Ratio Coverage with Considering the Gear Spacing Ratio

In general, the range of planetary gear ratio "α" is from 0.35 to 0.65. Preferably, the gear spacing ratio is made small as the gear change has a higher speed position.

As is seen from the table of FIG. 12, in the RAVIGNEAWX-I, the ratio coverage has a narrower range from the minimum value 4.81 to the maximum value 7.20. This is because of a fixed number of teeth of the fifth ring gear R5 (see FIG. 11).

While, in the INVENTION-I, the planetary gear ratios "α1" and "α2" of the second and third planetary gear units G2 and G3 (see FIG. 1) can be set separately. Accordingly, as is seen from the table of FIG. 12, the ratio coverage can have a relatively wider range from the minimum value 4.74 to the maximum value 7.80. Thus, in the invention, increase in freedom in selecting the gear ratio is achieved.

The RAVIGNEAWX-I and RAVIGNEAWX-II show their ratio coverage values 6.12 and 6.95 respectively. However, the planetary gear ratios "α3" of the RAVIGNEAWX-I and RAVIGNEAWX-II show values 0.37 and 0.35 respectively. That is, in the ravigneawx type speed change mechanism, when the ratio coverage increases, the planetary gear ratio "α3" becomes small. As has been mentioned hereinabove, reduction of the planetary gear ratio "α3" brings about the radial expansion of the transmission case.

In the INVENTION and the RAVIGNEAWX-I, the same values are shown for the gear ratio throughout all of the forward speeds (viz., from $1^{st}$ to $6^{th}$ speeds). However, the planetary gear ratio "α3" (viz., 0.37) of the RAVIGNEAWX-I is quite small as compared with that "α3" (viz., 0.59) of the INVENTION. This means that in the RAVIGNEAWX-I, the transmission case has a radially expanded zone at the portion where the planetary gear unit G5 is installed (see FIG. 11).

(5) Comparison in 1-R Ratio

In general, the 1-R ratio (viz., gear ratio at the reverse position/gear ratio at $1^{st}$ forward speed) is with a range from 0.8 to 1.2. If the 1-R ratio has a value largely different from such range, output torque produced when an accelerator is pressed becomes different between the reverse position and $1^{st}$ forward speed, which means deterioration in drivability of an associated motor vehicle.

The comparative table of FIG. 13 shows at the lower row respective 1-R ratio values of the speed change mechanism of the invention, the ravigneawx type speed change mechanism of Japanese Laid-open Patent Application 4-219553 and the speed change mechanism of Japanese Laid-open Patent Application 2001-349390.

Figure 15:
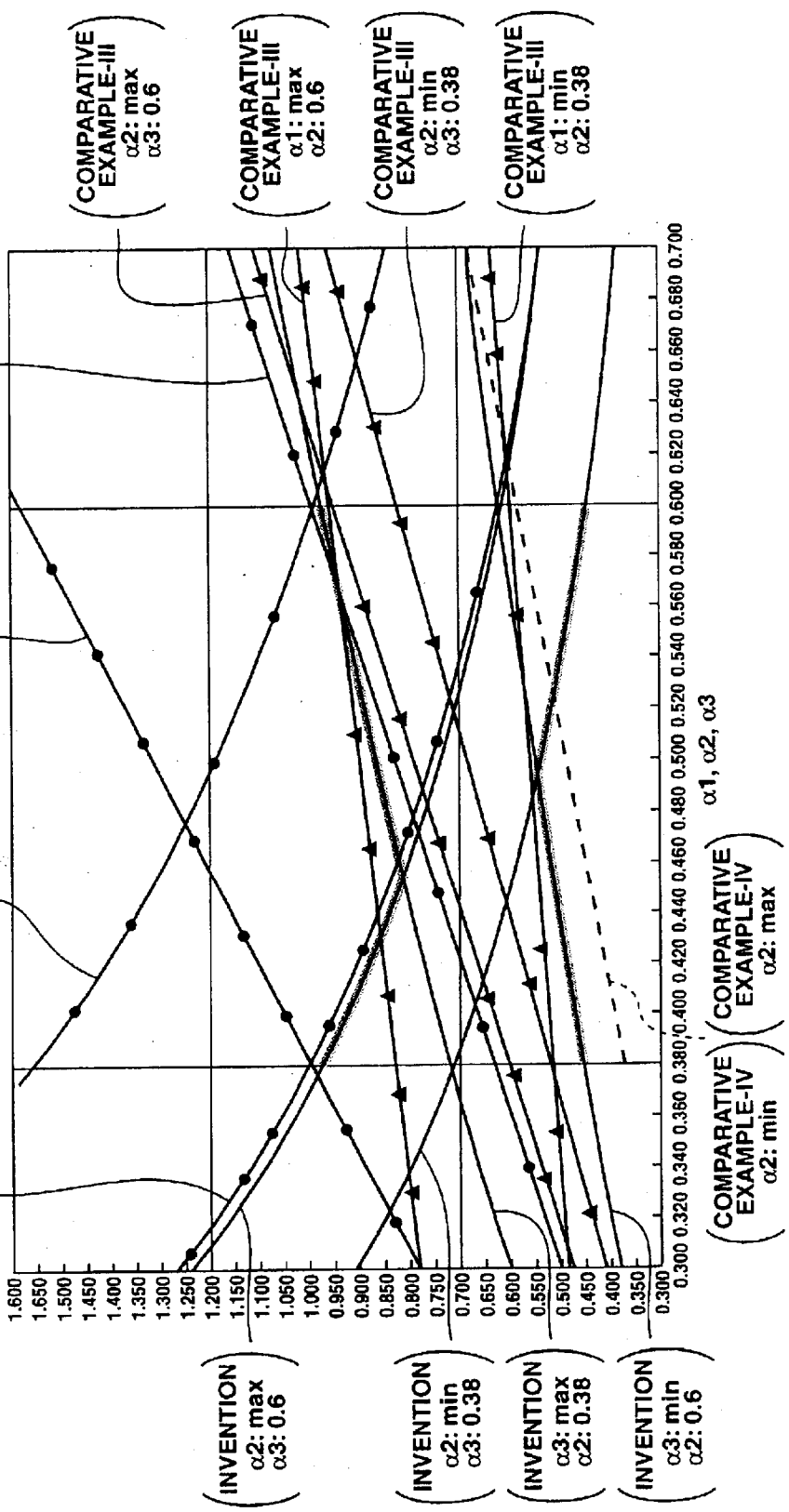
FIG. 15 is a graph showing a change of the 1-R ratio in case of the speed change mechanism of the invention, the speed change mechanism including the single pinion type planetary gear unit and the ravigneawx type planetary gear unit and the speed change mechanism including the single speed reduction planetary gear unit and the two single pinion type planetary gear units.

FIG. 15 is a comparative graph showing a change of the 1-R ratio in case of the speed change mechanism of the invention, the ravigneawx type speed change mechanism and the speed change mechanism of the Laid-open application 2001-349390 with at least one of the planetary gear ratios α1, α2 and α3 being varied. It is to be noted that in the speed change mechanism of the COMPARATIVE EXAMPLE-IV, the range of the 1-R ratio is controlled by varying only the planetary gear ratio α2.

In the following, the 1-R ratio of each speed change mechanism will be considered with reference to the contents of the lower row of the table of FIG. 13 and the graph of FIG. 15.

In the ravigneawx type speed change mechanism, the two speed change mechanisms of COMPARATIVE EXAMPLE-I and III, the 1-R ratio can have a range from 0.7 to 1.2. That is, the gear ratio for $1^{st}$ forward speed and that for reverse position can have a suitable value.

In the speed change mechanism of COMPARATIVE EXAMPLE-II, the 1-R ratio can not have a value lower than 1.22. In this case, the gear ratio at the reverse position become much larger than that at $1^{st}$ forward speed, and thus the drivability of the vehicle becomes deteriorated.

In the speed change mechanism of COMPARATIVE EXAMPLE-IV, the 1-R ratio is determined by varying only the planetary gear ratio α2. Thus, the 1-R ratio can not have a satisfactorily larger value. That is, as is seen from the graph of FIG. 15, in the COMPARATIVE EXAMPLE-IV, a suitable value is not obtained by either of $1^{st}$ forward speed and the reverse position, which means deterioration of drivability of the vehicle.

While in the speed change mechanism of the INVENTION, the 1-R ratio can have a range from 0.46 to 0.99, and thus, like the speed change mechanisms of RAVIGNEAWX and COMPARATIVE EXAMPLES-I and III, a suitable gear ratio of the reverse position relative to that for $1^{st}$ forward speed can be set.

The entire contents of Japanese Patent Applications 2002-172610 filed Jun. 13, 2002 and 2003-132893 filed May 12, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A speed change mechanism of an automatic transmission for achieving 6-forward speed positions and one reverse position, comprising:

an input shaft adapted to be driven by a power source;

an output shaft coaxially arranged with the input shaft;

a first planetary gear unit which converts an input rotation from the input shaft to an output rotation whose speed is lower than that of the input rotation; and a first unit including second and third planetary gear units and arranged between the first planetary gear unit and the output shaft, the first unit being arranged to provide, by managing the output rotation from the first planetary gear unit, the output shaft with seven types of rotation which respectively correspond to the 6-forward speed positions and one reverse positions, the third planetary gear unit including a pinion carrier connected to a ring gear of the second planetary gear unit, wherein one of the second and third planetary gear units is of a double ring type which comprises a sun gear powered by the first planetary gear unit, inside and outside ring gears concentrically disposed around the sun gear, pinions each being meshed with the sun gear and the inside and outside ring gears, and a pinion carrier carrying the pinions, the pinion carrier being connected to the output shaft to rotate therewith; and a second unit arranged between the first planetary gear unit and the first unit to manage a power transmission therebetween.

2. A speed change mechanism as claimed in claim 1, in which the first unit comprises a center member which is arranged between the inside and outside ring gears to connect the pinion carrier to the output shaft.

3. A speed change mechanism as claimed in claim 2, in which the other of the second and third planetary gear units is of a single pinion type which comprises a sun gear powered by the first planetary gear unit, a ring gear concentrically disposed around the sun gear, pinions each being interposed between the sun gear and the ring gear and meshed with the sun gear and the ring gear, a pinion carrier carrying the pinions, the pinion carrier being connected to the inside ring gear of the double ring type planetary gear unit through a part of the first unit.

4. A speed change mechanism as claimed in claim 3, in which the first planetary gear unit is of a single pinion type which comprises a sun gear, a ring gear concentrically disposed about the sun gear, pinions each being disposed between the sun gear and the ring gear and meshed with the sun gear and the ring gear, and a pinion carrier carrying the pinions, wherein, upon operation of the speed change mechanism, one of the sun gear, the ring gear and the pinion carrier is fixed to serve as a fixed element and one of the remaining two is connected to the input shaft to serve as a rotation element thereby causing the remaining one to serve as a reduced speed element that rotates at a speed lower than the input shaft.

5. A speed change mechanism as claimed in claim 4, in which the first unit comprises:

a first connecting member which connects the pinion carrier of the second planetary gear unit to the inside ring gear of the third planetary gear unit;

a second connecting member which connects the rotation element of the first planetary gear unit to the outside ring gear of the third planetary gear unit, the second connecting member being connected to the input shaft;

a third clutch arranged in the second connecting member;

a third connecting member which connects the ring gear of the second planetary gear unit to the output shaft;

a fourth connecting member which connects the reduced speed element of the first planetary gear unit to the sun gear of the second planetary gear unit;

a second clutch arranged in the fourth connecting member;

a fifth connecting member which connects the reduced speed element of the first planetary gear unit to the sun gear of the third planetary gear unit;

a first clutch arranged in the fifth connecting member;

a first brake arranged between the pinion carrier of the second planetary gear unit and a case of the transmission; and a second brake arranged between the sun gear of the second planetary gear unit and the case of the transmission.

6. A speed change mechanism as claimed in claim 5, further comprising a control means which engages the first clutch and the first brake for establishing $1^{st}$ forward speed, engages the first clutch and the second brake for establishing $2^{nd}$ forward speed, engages the first and second clutches for establishing $3^{rd}$ forward speed, engages the first and third clutches for establishing $4^{th}$ forward speed, engages the second and third clutches for establishing $5^{th}$ forward speed, engages the third clutch and the second brake for establishing $6^{th}$ forward speed and engages the second clutch and the first brake for establishing the reverse position.

7. A speed change mechanism as claimed in claim 1, in which the first planetary gear unit is of a single pinion type which comprises a sun gear, a ring gear concentrically disposed about the sun gear, pinions each being disposed between the sun gear and the ring gear and meshed with the sun gear and the ring gear, and a pinion carrier carrying the pinions, wherein, upon operation of the speed change mechanism, one of the sun gear, the ring gear and the pinion carrier is fixed to serve as a fixed element and one of the remaining two is connected to the input shaft to serve as a rotation element thereby to cause the remaining one to serve as a reduced speed element that rotates at a speed lower than the input shaft.

8. A speed change mechanism as claimed in claim 1, in which the second planetary gear unit is of a single pinion type and the third planetary gear unit is of the double pinion type.

9. A speed change mechanism as claimed in claim 8, in which the second unit comprises:
   a first connecting member which connects a pinion carrier of the second planetary gear unit to the inside ring gear of the third planetary gear unit;
   a second connecting member which connects the ring gear of the first planetary gear unit to the outside ring gear of the third planetary gear unit, the second connecting member being connected to the input shaft;
   a third clutch arranged in the second connecting member;
   a third connecting member which connects a ring gear of the second planetary gear unit to the output shaft;
   a fourth connecting member which connects the pinion carrier of the first planetary gear unit to a sun gear of the second planetary gear unit;
   a second clutch arranged in the fourth connecting member;
   a fifth connecting member which connects the pinion carrier of the first planetary gear unit to the sun gear of the third planetary gear unit;
   a first clutch arranged in the fifth connecting member;
   a first brake arranged between the pinion carrier of the second planetary gear unit and a case of the transmission; and
   a second brake arranged between the sun gear of the second planetary gear unit and the case of the transmission.

10. A speed change mechanism as claimed in claim 9, further comprising a control means which engages the first clutch and the first brake for establishing $1^{st}$ forward speed, engages the first clutch the second brake for establishing $2^{nd}$ forward speed, engages the first and second clutches for establishing $3^{rd}$ forward speed, engages the first and third clutches for establishing $4^{th}$ forward speed, engages the second and third clutches for establishing $5^{th}$ forward speed, engages the third clutch and the second brake for establishing $6^{th}$ forward speed and engages the second clutch and the first brake for establishing the reverse position.

11. A speed change mechanism of an automatic transmission for achieving 6-forward speed and one reverse positions,
   an input shaft adapted to be driven by a power source;
   an output shaft coaxially arranged with the input shaft;
   a first planetary gear unit including a first sun gear fixed to a case of the transmission, a first ring gear connected to the input shaft, first pinions each being meshed with both the first sun gear and the first ring gear and a first pinion carrier carrying the first pinions;
   a second planetary gear unit including a second sun gear, a second ring gear, second pinions each being meshed with both the second sun gear and the second ring gear and a second pinion carrier carrying the second pinions;
   a third planetary gear unit including a third sun gear, third and fourth ring gears, third pinions each being meshed with the third sun gear and the third and fourth ring gears and a third pinion carrier carrying the third pinions;
   a first connecting member connecting the second pinion carrier to the fourth ring gear;
   a second connecting member connecting the first ring gear to the third ring gear;
   a third clutch incorporated with the second connecting member;
   a third connecting member connecting the second ring gear to the output shaft;
   a fourth connecting member connecting the first pinion carrier to the second sun gear;
   a second clutch incorporated with the fourth connecting member;
   a fifth connecting member connecting the first pinion carrier to the third sun gear;
   a first clutch incorporated with the fifth connecting member;
   a center member connecting the third pinion carrier to the third connecting member, the center member extending radially outward from the third pinion carrier to the third connecting member through a space defined between the third and fourth ring gears;
   a first brake which is able to brake the second pinion carrier; and
   a second brake which is able to brake the second sun gear.

12. A speed change mechanism as claimed in claim 11, further comprising a control means which engages the first clutch and the first brake for establishing $1^{st}$ forward speed, engages the first clutch and the second brake for establishing $2^{nd}$ forward speed, engages first and second clutches for establishing $3^{rd}$ forward speed, engages first and third clutches for establishing $4^{th}$ forward speed, engages the second and third clutches for establishing $5^{th}$ forward speed, engages the third clutch and the second brake for establishing $6^{th}$ forward speed and engages the second clutch and the first brake for establishing the reverse position.

13. A speed change mechanism of an automatic transmission for achieving 6-forward speed positions and one reverse position, comprising:
   an input shaft adapted to be driven by a power source;
   an output shaft coaxially arranged with the input shaft;
   a first planetary gear unit which converts an input rotation from the input shaft to an output rotation whose speed is lower than that of the input rotation; and
   a first unit including second and third planetary gear units and arranged between the first planetary gear unit and the output shaft, the first unit being arranged to provide, by managing the output rotation from the first planetary gear unit, the output shaft with seven types of rotation which respectively correspond to the 6-forward speed positions and one reverse position,
   wherein one of the second and third planetary gear units is of a double ring type which comprises a sun gear powered by the first planetary gear unit, inside and outside ring gears concentrically disposed around the sun gear, pinions each being meshed with the sun gear and the inside and outside ring gears, and a pinion carrier carrying the pinions, the pinion carrier being connected to the output shaft to rotate therewith, and the other of the second and third planetary gear units is of a single pinion type which comprises a sun gear powered by the first planetary gear unit, a ring gear concentrically disposed around the sun gear, pinions each being interposed between the sun gear and the ring gear and meshed with the sun gear and the ring gear, a pinion carrier carrying the pinions, the pinion carrier being connected to the inside ring gear of the double ring type planetary gear unit through a part of the first unit, and a center member which is arranged between the inside and outside ring gears to connect the pinion carrier to the output shaft; and a second unit arranged between the first planetary gear unit and the first unit to manage a power transmission therebetween.

14. A speed change mechanism as claimed in claim 13, in which the first planetary gear unit is of a single pinion type which comprises a sun gear, a ring gear concentrically disposed about the sun gear, pinions each being disposed between the sun gear and the ring gear and meshed with the sun gear and the ring gear, and a pinion carrier carrying the pinions, the sun gear being fixed and the ring gear being connected to the input shaft.

15. A speed change mechanism as claimed in claim 14, in which the first unit comprises:

a first connecting member which connects the pinion carrier of the second planetary gear unit to the inside ring gear of the third planetary gear unit;

a second connecting member which connects the ring gear of the first planetary gear unit to the outside ring gear of the third planetary gear unit, the second connecting member being connected to the input shaft;

a third clutch arranged in the second connecting member;

a third connecting member which connects the ring gear of the second planetary gear unit to the output shaft;

a fourth connecting member which connects the pinion carrier of the first planetary gear unit to the sun gear of the second planetary gear unit;

a second clutch arranged in the fourth connecting member;

a fifth connecting member which connects the pinion carrier of the first planetary gear unit to the sun gear of the third planetary gear unit;

a first clutch arranged in the fifth connecting member;

a first brake arranged between the pinion carrier of the second planetary gear unit and a case of the transmission; and a second brake arranged between the sun gear of the second planetary gear unit and the case of the transmission.

16. A speed change mechanism as claimed in claim 15, further comprising a control means which engages the first clutch and the first brake for establishing $1^{st}$ forward speed, engages the first clutch the second brake for establishing $2^{nd}$ forward speed, engages the first and second clutches for establishing $3^{rd}$ forward speed, engages the first and third clutches for establishing $4^{th}$ forward speed, engages the second and third clutches for establishing $5^{th}$ forward speed, engages the third clutch and the second brake for establishing $6^{th}$ forward speed and engages the second clutch and the first brake for establishing the reverse position.

17. A speed change mechanism as claimed in claim 13, in which the second planetary gear unit is of a single pinion type and the third planetary gear unit is of the double pinion type.

18. A speed change mechanism as claimed in claim 17, in which the second unit comprises:

a first connecting member which connects a pinion carrier of the second planetary gear unit to the inside ring gear of the third planetary gear unit;

a second connecting member which connects the ring gear of the first planetary gear unit to the outside ring gear of the third planetary gear unit, the second connecting member being connected to the input shaft;

a third clutch arranged in the second connecting member;

a third connecting member which connects a ring gear of the second planetary gear unit to the output shaft;

a fourth connecting member which connects the pinion carrier of the first planetary gear unit to a sun gear of the second planetary gear unit;

a second clutch arranged in the fourth connecting member;

a fifth connecting member which connects the pinion carrier of the first planetary gear unit to the sun gear of the third planetary gear unit;

a first clutch arranged in the fifth connecting member;

a first brake arranged between the pinion carrier of the second planetary gear unit and a case of the transmission; and a second brake arranged between the sun gear of the second planetary gear unit and the case of the transmission.

19. A speed change mechanism as claimed in claim 18, further comprising a control means which engages the first clutch and the first brake for establishing $1^{st}$ forward speed, engages the first clutch the second brake for establishing $2^{nd}$ forward speed, engages the first and second clutches for establishing $3^{rd}$ forward speed, engages the first and third clutches for establishing $4^{th}$ forward speed, engages the second and third clutches for establishing $5^{th}$ forward speed, engages the third clutch and the second brake for establishing $6^{th}$ forward speed and engages the second clutch and the first brake for establishing the reverse position.

* * * * *